3,536,956
THREE-PHASE UNDERVOLTAGE PROTECTION CIRCUIT
Frederick Max Stewart, 4164 Timber Lane,
Des Moines, Iowa 50317
Filed Apr. 19, 1968, Ser. No. 722,800
Int. Cl. H02h 3/38, 5/04
U.S. Cl. 317—13      2 Claims

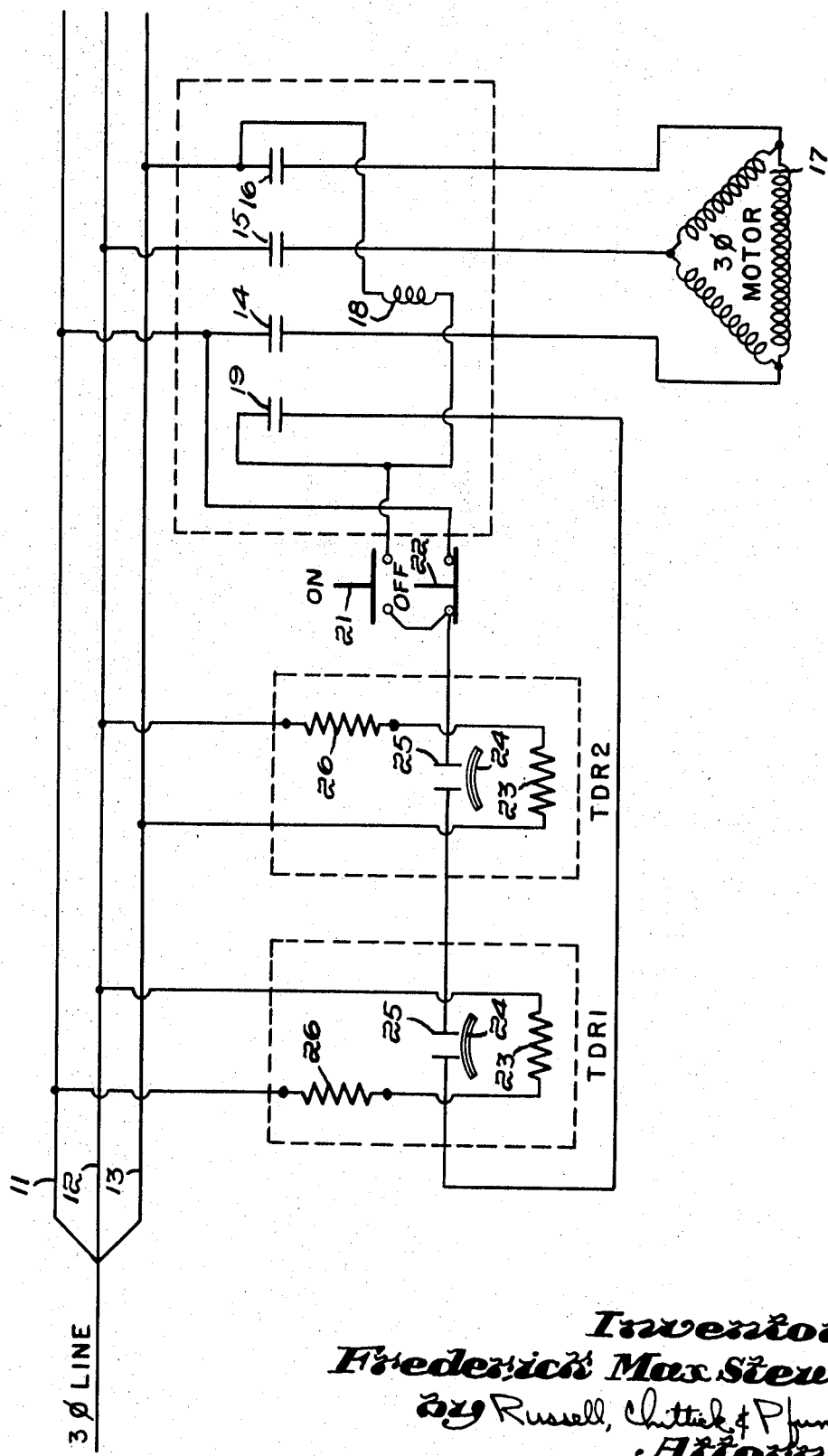

ABSTRACT OF THE DISCLOSURE

A low voltage protective circuit for three-phase loads has two thermal time delay relays with heater circuits connected across two-phase voltages and contacts which are closed when the heater circuits are energized at full phase voltage. The contacts are series connected to energize a load relay which connects the three-phase line to the three-phase load. Undervoltage on any phase for a period equal to the time delay of the time delay relays opens one of the time delay relay contacts and deenergizes the load via the load relay.

BACKGROUND OF THE INVENTION

The field of the present invention relates to electric circuit protecting devices and particularly to the protection of three-phase circuits from continued operation when one or more phase voltages drops below a safe operating level for a predetermined period of time.

Prior art undervoltage protection circuits have been provided using relatively complex arrangements of electromagnetic actuators such as shown in the patent to Taylor No. 2,345,510. Such circuits being relatively expensive have not found as wide application as would be possible with more simplified and economical devices.

The application of thermal time delay relays for the protection of motor circuits has been provided in the prior art, for example, in the patent to Lytle No. 2,758,255. While such circuits have utilized thermally responsive actuators in response to three-phase load currents to protect the three-phase load from single phase or double phase conditions they have not been applied to sense phase voltage and protect the three-phase load from an undervoltage condition in any of the three phases which could result in overheating or damage to the three-phase machine.

SUMMARY OF THE INVENTION

The present invention uses an extremely simple circuit to sense phase voltage for low voltage conditions and relies upon the inter-dependence of the three-phase voltages to permit monitoring with only two thermal time delay relays. These relays are connected across two-phase voltages and when so energized by the normal phase voltage on the three-phase operate thermally responsive actuators to close a set of contacts in each thermal time delay relay. These contacts are connected in series to control a load relay in a manner that interrupts load current via the load relay contacts whenever one or more of the three-phase voltages drops below a predetermined value for a period of time greater than the actuation delay time of the thermal time delay relays.

BRIEF DESCRIPTION OF THE DRAWING

The single figure shows a schematic wiring diagram of two time delay relays connected with a manually operated start and stop switch and a load relay to provide for energizing a three-phase load and protecting the load from undervoltage on any of the three phases.

DESCRIPTION OF THE PREFERRED EMBODIMENT

Referring to the drawing, a three-phase line is represented having conductors 11, 12 and 13 between which the three-phase voltages appear. The three-phase lines 11, 12 and 13 are connected through normally open contacts 14, 15 and 16 to a three-phase load 17 represented as a three-phase delta wound motor. The contacts 14, 15 and 16 are closed upon energization of a relay coil 18 and when the coil 18 is energized a latching contact 19 is also closed. The relay coil 18 can be energized by depressing a manually operated "on" switch 21 to close normally open contacts and complete a circuit through normally closed contacts of an "off" switch 22.

Undervoltage protection for the three-phase motor load 17 is provided by two thermal time delay relays TDR–1 and TDR–2 which may be, for example, Amperite Company type 115NO2. Each of the time delay relays has a heater 23 connected through a resistor 26 to two of the lines of the three-phase line. For example, TDR–1 has its heater 23 connected between lines 11 and 12. Each of the time delay relays also has a bimetallic actuator 24 which operates normally open contacts 25 to closed condition when the applied voltage is sufficiently high and opens the contacts 25 a predetermined time after the voltage falls below a predetermined value.

The resistor 26 may be changed in value by substitution or, if desired, a rheostat may be used in place of the fixed resistor 26. In this manner the heating effect of the heater 23 can be selected to correspond to a predetermined phase voltage between the lines 11 and 12 for TDR–1, thereby selecting the undervoltage condition at which the actuator 24 will revert the contacts 25 to open position. Similarly TDR–2 has its heater 23 connected through a resistor 26 across the lines 12 and 13.

The normally open contacts 25 of the relays TDR–1 and TDR–2 are series connected through the normally closed contacts of "off" switch 22 to line 11 of the three-phase line. This circuit completes the connection of relay coil 18 through latching contacts 19 so that the relay coil 18 is maintained energized whenever latching contacts 19, thermal delay relay contacts 25 in both TDR–1 and TDR–2 and "off" switch contacts 22 are all closed. Whenever any phase voltage on the three-phase line drops below a predetermined level, the change will be reflected as an unbalance that will open one or the other of the contacts 25 in TDR–1 or TDR–2, thereby deenergizing the coil 18 and opening the contacts 14, 15 and 16 to deenergize the load 17. Thus there is no possibility of the three-phase load 17 running on single or double phase when one of the phase voltages drops below the predetermined value established by the actuating characteristics of the relays TDR–1 and TDR–2. These relays inherently have a time delay so that any undervoltage condition has to last for a period longer than the actuation time required of the heater actuator mechanism of TDR–1 and TDR–2.

Many modifications may be made in the circuit described and shown herein without departing from the spirit and scope of the invention as defined in the appended claims. In particular, other arrangements of load relays and additional protective devices for the three-phase load may be incorporated according to generally accepted practice instead of the simple load relay shown herein. The invention therefore will generally be used in addition to overload and internal thermal sensing protective circuits to provide a simple and economical undervoltage protection which can be adapted to operate rapidly before more serious faults develop due to conditions which bring other protective devices into action.

I claim:
1. A three-phase low voltage protection circuit comprising:
   first and second thermal time delay relays each having a set of normally open contacts, a heater circuit independent of said contacts and heat responsive actuator means for closing said contacts;
   means for connecting the respective heater circuits of said relays across two-phase voltages of a three-phase supply line, each of said heater circuits operating one of said actuator means when energized by normal phase voltage to close one of said set of contacts and to open said set of contacts for phase voltage less than predetermined magnitude; and
   means connecting said set of contacts of both said relays in series for controlling a load relay which when energized connects load current directly from said three-phase line to a three-phase load without flowing through said contacts;
   said predetermined magnitude being equal to the low phase voltage condition at which interruption of load current is desired.

2. Apparatus according to claim 1 which includes a resistor in series with each of said heater circuits with means for changing the resistance value to select the magnitude of phase voltage at which said contacts open.

References Cited

UNITED STATES PATENTS

| | | | |
|---|---|---|---|
| 2,607,831 | 8/1952 | Jones | 317—40 X |
| 3,334,273 | 8/1967 | Howland | 317—48 |

JAMES D. TRAMMELL, Primary Examiner

U.S. Cl. X.R.

317—27, 31, 40, 132